Patented Feb. 2, 1932

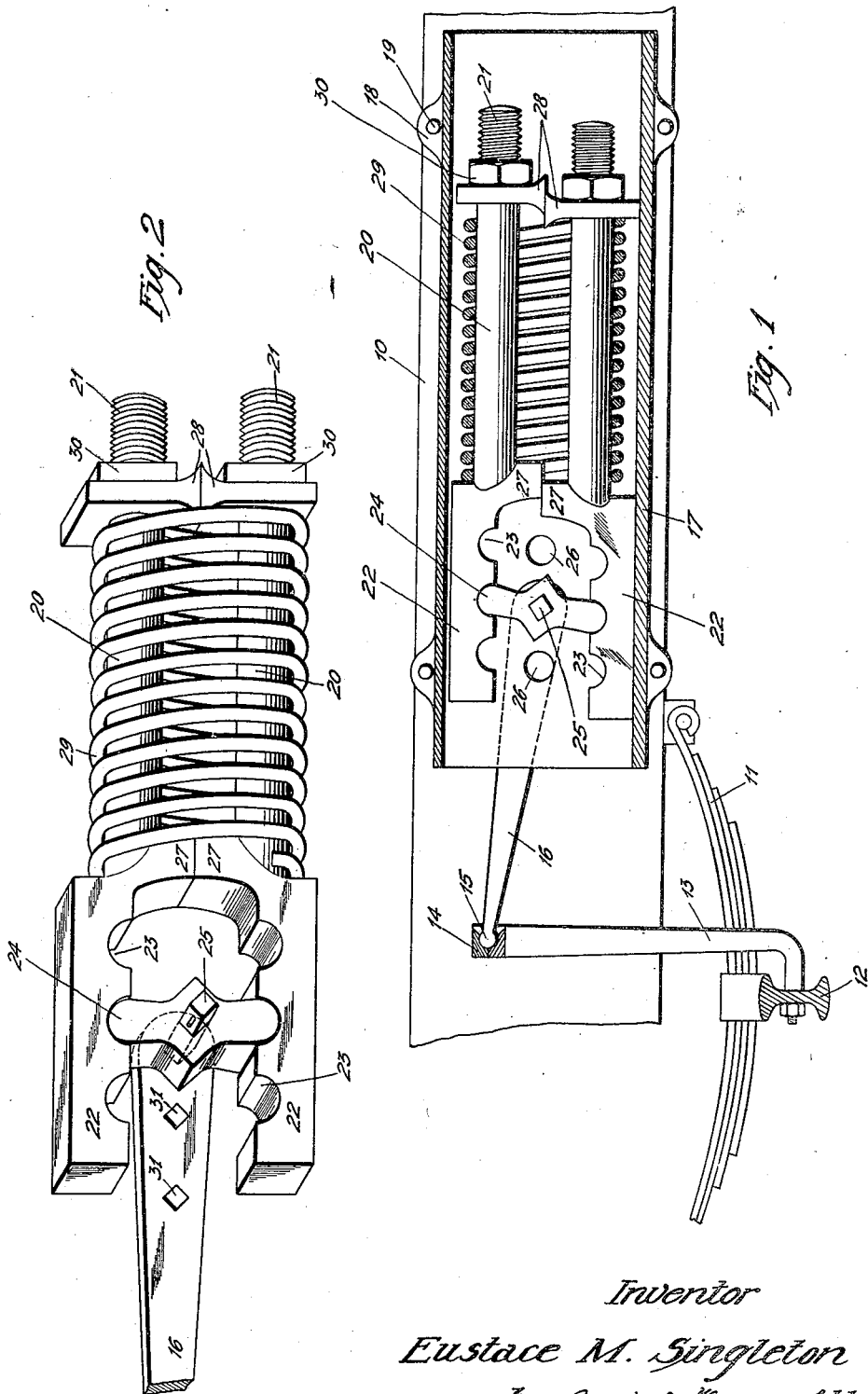

1,843,344

UNITED STATES PATENT OFFICE

EUSTACE M. SINGLETON, OF MARSHALLTOWN, IOWA

SHOCK ABSORBER FOR AUTOMOBILES

Application filed May 4, 1931. Serial No. 534,818.

The object of this invention is to provide a shock absorber of simple, durable and inexpensive construction which may be easily and quickly applied to automobiles of ordinary construction, and when so applied provides means whereby both the up and down movement of the automobile frame relative to the axle may be modified to absorb severe shocks.

A further object is to provide in a shock absorber employing a shock receiving spring means for increasing or decreasing the tension of the spring at the will of the operator.

A further object is to provide a shock absorber which may be adapted to fit automobiles having bodies of different weights without changing the size of the spring or the tension adjustment of the spring.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a vertical, sectional view of the shock absorber casing showing the manner in which the mechanism is mounted therein.

Figure 2 is a perspective view of the mechanism removed from the casing.

Referring to the accompanying drawings, I have used the reference numeral 10 to indicate a portion of an automobile frame which is supported by a spring 11 of ordinary construction, said spring being carried by the axle 12. Supported in the axle 12 is a bracket 13. The upper end of the bracket 13 is provided with a socket 14 adapted to receive a ball 15 carried by one end of a lever 16. The shock absorber is mounted in a casing 17 having lets 18 by means of which the casing is mounted on the frame member 10 by suitable rivets or bolts 19.

Supported in the casing 17 is a pair of parallel slide bars 20, each bar having one end provided with a screw threaded portion 21 and its opposite end terminating in a rack portion 22. The inner edges of the portions 22 are provided with a series of notches 23. The notches of one of the bars 22 are opposite from those of the other bar.

A rock bar 24 is mounted on a shaft 25, and has its ends supported in a corresponding set of the notches 23. The shaft 25 is mounted in one of a number of suitable openings 26 in the side of the casing 17. One end of the shaft 25 is connected to the inner end of the lever 16.

The inner end of each of the portions 22 is provided with a bearing member 27. The bearing member of one member 22 is designed to be slidably mounted on the bearing member of the opposite member 22. Supported on the outer end of each of the members 20 is a bearing block 28 slidably mounted one relative to the other in the manner clearly illustrated in Figure 1.

The bars 20 are designed to support a helical spring 29 surrounding both of said bars, and having one end supported against the inner ends of the members 22, and its opposite end against the members 28. Nuts 30 are provided for placing tension on the spring 29 after it has been placed in position on the bars 20.

The tension thus placed on the spring 29 will cause the members 27 to be moved one directly over the other with the notches in the lower member 22 immediately below the corresponding notches 23 of the upper member, with the rock bar 24 in a vertical position and the lever 16 in a horizontal position. This is the normal working position of the slide bars and the lever 16.

It will be seen that if sudden downward pressure is applied to the frame 10, the spring 11 will yield, permitting the frame member 10 to lower, which in turn will lower the casing 17, causing the inner end of the lever 16 to be lowered and the bar 24 to be rocked in a clockwise direction, causing the upper slide bar 20 to be moved outwardly and the lower slide bar 20 to be moved inwardly and tension applied to the spring 29.

Sudden upward movement of the frame 10 will cause the slide bars 20 to be moved in the opposite direction and tension again to be applied to the spring 29. The spring 29 tends to regain the shock and to move the bars 20 and the lever 16 to its normal position of movement, thereby providing means whereby severe shocks caused by upward or downward movements of the frame will be absorbed.

If the spring 29 is slightly flattened to elongate the coils of the spring vertically at the time the spring is placed on the members 20, then it will be seen that the inner faces of the members 27 and 28 will be frictionally supported together, so that a snubbing action is also imparted to the movable members 20. This snubbing action eliminates free oscillation of the frame 10.

By providing a number of notches 23 and a number of openings 26, means is provided whereby the shaft 25 may be removed if so desired, and the rock bar 24 placed in another set of notches, with a shorter or longer lever 16 being substituted. If the lever is shorter, then the absorber is adapted to operate with a heavier frame; but if the lever is longer, then the absorber is adapted to operate with a lighter frame.

Thus means is provided whereby a single casing 17 and the mechanism therein may be utilized on frames of different weights, without altering the size of the spring or the tension applied thereto, or any mechanism, with the exception of substituting a longer or shorter lever; or the lever 16 may be provided with a series of openings 31 for receiving the shaft 25, and when the rock bar 24 is moved from one set of notches to another, of course, the distance between the openings 31 is the same as the distance between the openings 26 and the same as the pitch of the notches 23.

Thus it will be seen that I have provided a shock absorber of simple, durable and inexpensive construction which may be easily and quickly applied to automobiles of ordinary construction, and in which a single model or type of shock absorber may be used in connection with frames of various weights without altering or changing the shock absorber, and thereby providing means whereby the necessity of carrying two or three different sizes of shock absorbers in stock is eliminated, as well as the inconvenience of manufacturing several different sizes of shock absorbers to meet the demand.

I claim as my invention:

1. In a device of the class described, a casing, a helical spring therein, a pair of slide bars mounted longitudinally through said spring and slidably mounted relative to each other, said bars having shoulders engaging one end of said spring, adjustable members engaging the opposite end of said spring, a rock bar operatively connecting said bars for moving them in reverse directions, means for connecting the casing to an automobile frame, and means for connecting the lever to the axle of an automobile.

2. In a device of the class described, a casing, a helical spring therein, a pair of slide bars mounted longitudinally through said spring, and slidably mounted relative to each other, said bars having shoulders engaging each end of said spring, a rock bar connecting both of said bars, and an operating lever connected to said rock bar whereby rocking movement of said lever and rock bar will cause the slide bars to be moved one relative to the other and tension placed on said spring.

3. In a device of the class described, a casing, a helical spring supported in said casing, a pair of slide bars supported longitudinally in said spring and slidably mounted relative to each other, said bars having shoulders for engaging each end of said spring, said bars being frictionally supported one adjacent to the other, lever mechanism for reciprocating said bars longitudinally, means for connecting said casing to the frame of an automobile, and means for connecting said lever mechanism to the axle of said automobile.

4. In a device of the class described, a casing, a helical spring therein, a pair of slide bars supported longitudinally within said casing and within said spring, said bars having shoulders for engaging the ends of said spring, one set of the corresponding ends of said bars terminating in rack portions, the inner edges of said portions being provided with notches, a rock bar supported in a corresponding set of notches, and a lever for imparting rocking movement to said rock bar.

5. In a device of the class described, a casing, a helical spring therein, a pair of slide bars supported longitudinally within said casing and within said spring, said bars having shoulders for engaging the ends of said spring, one set of the corresponding ends of said bars terminating in rack portions, the inner edges of said portions being provided with notches, a rock bar supported in a corresponding set of notches, and a lever for imparting rocking movement to said rock bar, the opposite end of said bars each having means for adjusting the tension applied to said spring.

6. In a device of the class described, a casing, a helical spring in said casing, a pair of slide bars mounted longitudinally through said spring and having shoulders for engaging each end of the spring, one set of corresponding ends of said slide bars being provided with rack portions having notches, a rock bar supported in a corresponding set of notches, a lever having a series of openings, a shaft supported in one of said openings and detachably supported in said rock bar, said casing also having openings for receiving said shaft.

Des Moines, Iowa, April 27, 1931.

EUSTACE M. SINGLETON.